United States Patent [19]

Sorko-Ram

[11] Patent Number: 4,842,921

[45] Date of Patent: Jun. 27, 1989

[54] PATTERNED MIRROR

[76] Inventor: Paul O. Sorko-Ram, 63412 M-66 N., Sturgis, Mich. 49091

[21] Appl. No.: 26,536

[22] Filed: Mar. 16, 1987

[51] Int. Cl.$^4$ ................................................ G02B 5/08
[52] U.S. Cl. ................................... 428/187; D6/307; 40/583; 350/600; 428/912.2
[58] Field of Search ............. 428/67, 187, 195, 912.2; D6/307; 40/583; 350/600

[56] References Cited

U.S. PATENT DOCUMENTS

| | | | |
|---|---|---|---|
| 2,358,720 | 9/1944 | Larmour | 428/67 |
| 2,411,187 | 11/1946 | Boogher | 428/187 X |
| 2,506,165 | 5/1950 | Mountcastle | 428/187 X |
| 2,955,371 | 10/1960 | Brunner | 428/187 X |
| 4,579,768 | 4/1986 | Post | 428/187 |

Primary Examiner—Henry F. Epstein
Attorney, Agent, or Firm—Krass & Young

[57] ABSTRACT

The invention is a multi-part patterned mirror of thermoplastic material. The mirror is formed by utilizing a numerically controlled laser cutting machine to create an opening in a sheet of thermoplastic material, and an identical cutting step to create a cutting to be inserted in the opening created by the first laser cutting step. The assembled materials create the appearance of a patterned mirror of varying colors on one continuous sheet of thermoplastic.

5 Claims, 1 Drawing Sheet

PATTERNED MIRROR

FIELD OF THE INVENTION

This invention is related to intricately patterned thermoplastic materials and to methods of producing such patterns using numerically controlled laser cutting.

PRIOR ART

Normally, inlaid patterns in thermoplastics are made by typical mosaic processes, this includes using either a die or preprinted pattern form to punch or cut a shape or pattern in the material. Adhesives are then used to secure the pieces together. In a variety of solid materials, particularly thermoplastics, the conventional methods for creating such patterns are expensive and time consuming. Further, because such processes are manually controlled and use conventional cutting equipment, the boundaries between the surrounding and inlaid materials are imprecise. Further, conventional cutting techniques create a rough, unpolished edge on the pieces to be assembled, which creates visual irregularities in transparent or semi-transparent materials. The within invention overcomes these limitations.

SUMMARY OF THE INVENTION

The present invention provides a novel assembly of multiple thermoplastic transparent materials and a method of making the same. A desired pattern of the finished materials is translated to a set of instructions, which are suitable for operating a numerically controlled laser cutting device. The pattern so committed and translated forms the basis for a series of instructions to guide the cutting beam of the cutting tool, creting a precisely defined opening of desired size and shape in a thermoplastic material. The laser cutting involves melting the edges of the parts and after passage of the beam the cut edges solidify to present a polished surface.

A second identical cutting of a contrasting color, shade or hue of similar material, of the same or a different thickness, is used to produce a cutting which precisely matches in dimension the opening created by the first laser cut. The cutting produced by the second laser cut is then inserted into the matching cavity created by the first laser cut and the pieces are appropriately secured to a common backing layer.

DESCRIPTION OF THE PREFERRED EMBODIMENT

Figure 1:
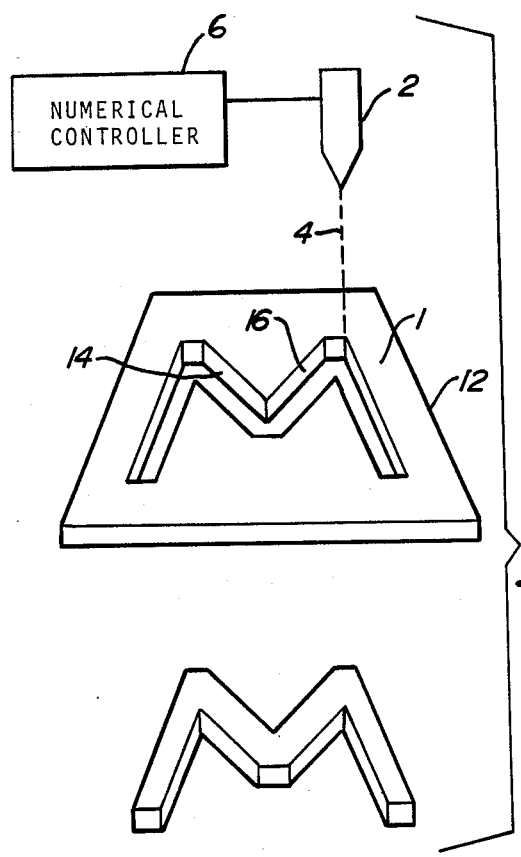
FIG. 1 shows, in stylized form, the laser cutting of the transparent material.

Referring now to FIG. 1, a numerically controlled device 6 serves to operate a laser cutting tool 2. The continuous wave laser beam 4 effects a through-and-through cut of a planar section of a transparent thermoplastic material 1, preferably acrylic, thereby creating a cavity 14 in the shape and size of the desired pattern.

Figure 2:
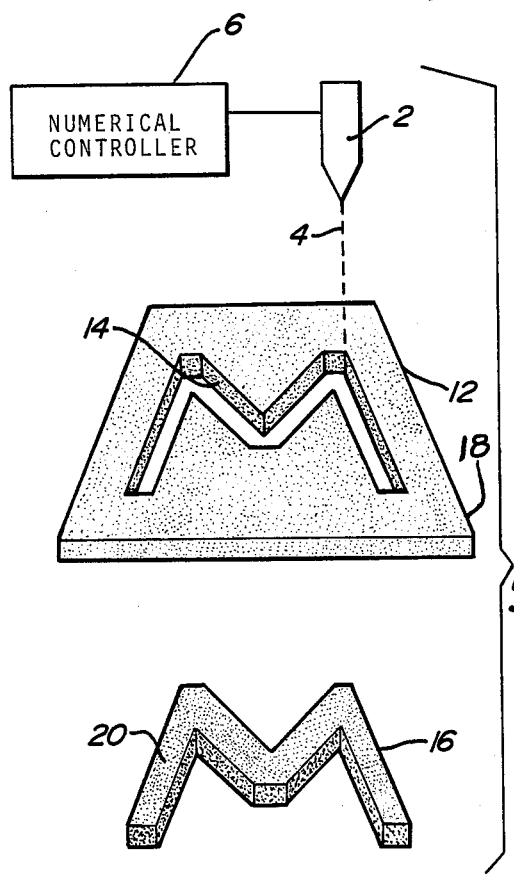
FIG. 2 shows a similar cutting of the second material.

Referring to FIG. 2, a similar process is followed to create a second, identical cut in a sheet of thermpolastic material of contrasting composition, color, or both. In the preferred embodiment of the invention, both the first said material 1 and the second said material 18 are coated, on one surface, with a reflective coating 12 (see also FIG. 1). This coating is typicaly applied by vapor deposition, creating a mirrored appearance to the material.

It can be seen that the cutting 20 is of such dimension, having been formed from the same numerically controlled laser cutter, using an identical pattern, so as to allow a precise fit in the cavity 14 created in the first material 1. Referring again to FIGS. 1 and 2, it can also be seen that by virtue of the unique properties of the laser cutting equipment as well as the unique properties of the thermoplastics, the cut at the edge 16 of the repsective cuts creating the cavity 14 and the cutting 20 is highly polished and uniform. Additionally, because of the utilizing of the same numerical cutting equipment and patterns, the fit between the cutting and the cavity can be made to be extremely precise and snug.

Figure 3:
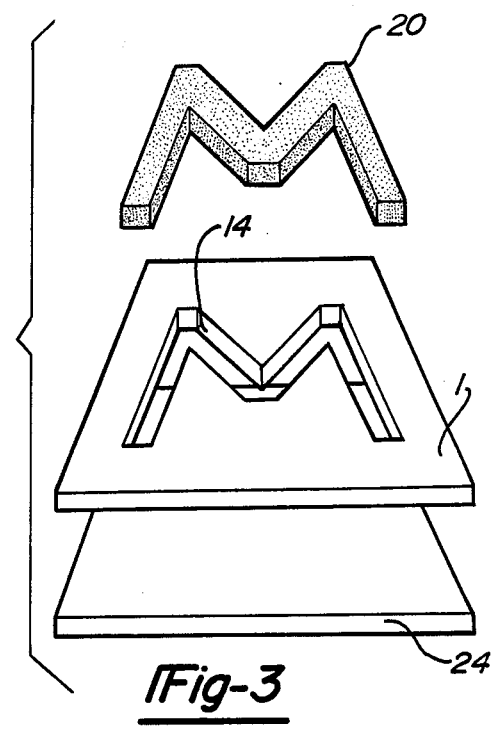
FIG. 3 shows in perspective view, the assembly of the cutting to the cavity.

Referring now to FIG. 3, the cutting 20 is inserted into cavity 14 of said thermoplastic material 1. In the preferred embodiment, the thicknesses of the materials used for the creation of the cavity portion and the cutting portion are identical. In alternative embodiments of the invention, sections of different thickness may be used, creating a three-dimensional effect.

Figure 4:
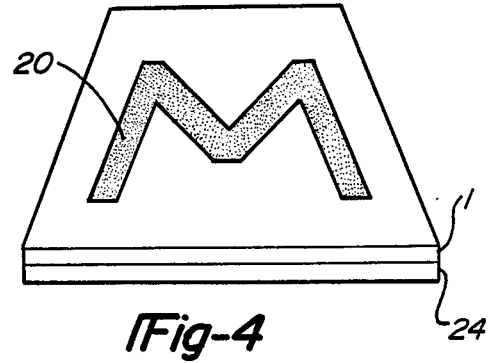
FIG. 4 shows the completed product.

The cutting and the cavity containing the cutting are secured together, and the resulting thermoplastic material sheet comprises a continuous surface, wherein the cutting created by the process is in contrast to the apparent background. The overall effect is of a pleasing mirrored surface which can take a wide variety of forms, and one of which the fit between the respective pieces is precise and aesthetically pleasing. No adhesive is necessary along the abutting edges. However, if desired, the assembled material 1 including the cutting 20 may be mounted on a substrate 24 using water-based adhesives which will not deleteriously affect the reflective layer. The reflective layer masks the adhesive from view. The completed product appears in FIG. 4.

Another variation in the apparatus and method contemplates the utiliztion of both of the original materials 1 and 18 and both of the cuttings 20. Each process of manufacture for one of the assemblies creates the raw materials for the complementary portion of a second such device. Moveover, in manufacture of either symmetric or asymmetric patterns, the completed patterns consisting of two assembled units of first material and second material insert may be joined together in back-to-back fashion thereby creating a double sided pattern, whereby the pattern on one side consists of background color A and pattern color B, and the first side consists of background color B and pattern color A.

Having thus described my invention, what is claimed is:

1. A patterned mirror comprising:
    a first planar section of a first optically transparent thermoplastic material of a first color, having a front surface and a back surface, and having at least one cavity formed therein with substantially vertical side walls, said side walls having a smooth and optically reflective surface;
    a first layer of optically reflective material disposed on the back surface of said first planar section;
    at least one second planar section equal in number to the number of said at least one cavity of said first planar section, each formed of a second optically transparent thermoplastic material of a second color contrasting with said first color, each having a front surface and a back surface, each having dimensions complementary to and disposed within a corresponding cavity of said first planar section with said back surface of each of said at least one second planar section within the same plane as said back surface of said first planar section, and each having substantially vertical side walls, said side walls having a smooth and optically reflective surface;

a second layer of optically reflective material disposed on the back surface of each of said at least one second planar section; and a mounting means coupled to said first planar section and each of said at least one second planar section for holding said back surface of each of said at least one second planar section within the same plane as said back surface of said first planar section.

2. The patterned mirror as claimed in claim 1, wherein:

said mounting means consists of
  a planar substrate having a first surface equal in dimensions as said back surface at said first planar section, and
  a layer of adhesive disposed on said first surface of said planar substrate for holding said first planar section and each of said at least one second planar section parallel to said first surface of said planar subsrate.

3. The patterned mirror as claimed in claim 1, wherein:

said first planar section has a first depth; and
each of said at least one second planar section has a depth equal to said first depth.

4. The patterned mirror as claimed in claim 1, wherein:

said first planar section has a first depth; and
each of said at least one second planar section has a second depth different than said first depth.

5. A two sided patterned mirror comprising:

a first planar section of a first optically transparnt thermoplastic material fo a first color, having a front surface and a back surface, and having at least one cavity formed therein with substantially vertical side walls, said side walls having a smooth and optically reflective surface;

a first layer of optically reflective material disposed on the back surface of said first planar section;

at least one second planar section equal in number to the number of said at least one cavity of said first planar section, each formed of a second optically trnasparent thermoplastic material of a second color contrasting with said first color, each having a front surface and a back surface, each having dimensions complementary to and disposed within a corresponding cavity of said first planar section with said back surface of each of said at least one second planar section within the same plane as said back surface of said first planar section, and each having substantially vertical side walls, said side walls having a smooth and optically reflective surface;

a second layer of optically reflective material disposed on the back surface of each of said at least one second planar section;

a third planar section of said second optically transparent thermoplastic material of said second color, having a front surface and a back surface, and having dimensions equal to the dimensions of said first planar section including a cavity formed therein corresponding to each of said at least one cavity of said first planar section, each said cavity with substantially vertical side walls, said side walls having a smooth and optically reflective surface;

a third layer of optically reflective material disposed on the back surface of said third planar section;

at least one fourth planar section equal in number to the number of said at least one cavity of said third planar section, each formed of said first optically transparent thermoplastic material of said first color, each having a front surface and a back surface, each having dimensions complementary to and disposed within a corresponding cavity of said third planar section with said back surface of each of said at least one fourth planar section within the same plane as said back surface of said third planar section, and each having substantially vertical side walls, said side walls having a smooth and optically reflective surface;

a fourth layer of optically reflective material disposed on the back surface of each of said at least one fourth planar section; and a layer of adhesive disposed between said back surface of said first and second planar sections and said back surfaces of said third and fourth planar sections, thereby forming a unitary structure with complementary patterns on opposite sides.

* * * * *